(12) United States Patent
Taha et al.

(10) Patent No.: US 12,164,159 B2
(45) Date of Patent: Dec. 10, 2024

(54) BACKSIDE OPTICAL CONNECTOR

(71) Applicant: Teramount Ltd., Jerusalem (IL)

(72) Inventors: Hesham Taha, Jerusalem (IL);
Abraham Israel, Jerusalem (IL)

(73) Assignee: Teramount Ltd., Jerusalem (IL)

( * ) Notice: Subject to any disclaimer, the term of this patent is extended or adjusted under 35 U.S.C. 154(b) by 0 days.

(21) Appl. No.: 17/645,667

(22) Filed: Dec. 22, 2021

(65) Prior Publication Data

US 2023/0194804 A1 Jun. 22, 2023

(51) Int. Cl.
*G02B 6/42* (2006.01)
*G02B 6/30* (2006.01)

(52) U.S. Cl.
CPC .............. *G02B 6/4214* (2013.01); *G02B 6/30* (2013.01); *G02B 6/4228* (2013.01); *G02B 6/4292* (2013.01); *G02B 6/4249* (2013.01)

(58) Field of Classification Search
CPC .......... G02B 6/262; G02B 6/30; G02B 6/305; G02B 6/3692; G02B 6/3834; G02B 6/3845; G02B 6/3873; G02B 6/4214; G02B 6/4228; G02B 6/4246; G02B 6/4292; G02B 6/423; G02B 6/4249
See application file for complete search history.

(56) References Cited

U.S. PATENT DOCUMENTS

| | | | |
|---|---|---|---|
| 4,744,618 A | 5/1988 | Mahlein | |
| 4,763,977 A | 8/1988 | Kawasaki et al. | |
| 5,627,931 A | 5/1997 | Ackley et al. | |
| 5,913,002 A | 6/1999 | Jiang | |
| 5,939,782 A | 8/1999 | Malladi | |
| 6,122,417 A | 9/2000 | Jayaraman et al. | |
| 6,198,864 B1 | 3/2001 | Emoff et al. | |
| 6,271,970 B1 | 8/2001 | Wade | |
| 6,423,956 B1 | 7/2002 | Mandella et al. | |
| 6,571,039 B1 | 5/2003 | Al-Hemyari et al. | |
| 6,600,845 B1 | 7/2003 | Feldman et al. | |
| 6,654,533 B1 | 11/2003 | Koteles et al. | |
| 6,801,693 B1 | 10/2004 | Jacobowitz et al. | |
| 6,832,031 B2 | 12/2004 | Smaglinski | |
| 6,862,092 B1 | 3/2005 | Ibsen et al. | |
| 6,888,988 B2 | 5/2005 | Vancoille et al. | |

(Continued)

FOREIGN PATENT DOCUMENTS

| | | |
|---|---|---|
| CA | 1253377 A | 5/1989 |
| CN | 1387626 A | 12/2002 |

(Continued)

OTHER PUBLICATIONS

International Search Report and Written Opinion of International Searching Authority for PCT/IB2021/062224, ISA/IL, Jerusalem, Israel, Dated: Mar. 17, 2022.

(Continued)

*Primary Examiner* — Michael P Mooney
(74) *Attorney, Agent, or Firm* — Banner & Witcoff, Ltd.

(57) ABSTRACT

A connector for use in coupling an optical signal between an optical fiber in an optical plug mounted to a bottom of a silicon photonics (SiPh) chip is provided. The connector comprises: a curved mirror; and a tilted flat mirror; wherein at least one of the curved mirror and the tilted flat mirror is formed on a hardened stamped imprint material that was deposited on the SiPh chip at least in a cavity thereof.

19 Claims, 16 Drawing Sheets

(56) References Cited

U.S. PATENT DOCUMENTS

| | | |
|---|---|---|
| 6,941,047 B2 | 9/2005 | Capewell et al. |
| 6,960,031 B2 | 11/2005 | McFarland et al. |
| 7,050,304 B2 | 5/2006 | Hsu et al. |
| 7,058,275 B2 | 6/2006 | Sezerman et al. |
| 7,139,448 B2 | 11/2006 | Jain et al. |
| 7,260,328 B2 | 8/2007 | Kropp |
| 7,288,756 B2 | 10/2007 | Sherrer et al. |
| 7,317,746 B2 | 1/2008 | Ericson et al. |
| 7,358,109 B2 | 4/2008 | Gallup et al. |
| 7,366,380 B1 | 4/2008 | Peterson et al. |
| 7,447,404 B2 | 11/2008 | Miller |
| 7,567,391 B1 | 7/2009 | Strauch, III et al. |
| 7,853,101 B2 | 12/2010 | Carothers |
| 7,970,041 B2 | 6/2011 | Arimoto et al. |
| 8,000,565 B2 | 8/2011 | Liu |
| 8,117,982 B2 | 2/2012 | Gruber et al. |
| 8,390,806 B1 | 3/2013 | Subramanian |
| 8,422,836 B2 | 4/2013 | Riester et al. |
| 8,471,467 B2 | 6/2013 | Boerner |
| 8,548,287 B2 | 10/2013 | Thacker et al. |
| 8,582,934 B2 | 11/2013 | Adler et al. |
| 8,803,269 B2 | 8/2014 | Shastri et al. |
| 8,834,146 B2 | 9/2014 | Saha et al. |
| 8,836,942 B2 | 9/2014 | Quan et al. |
| 8,929,693 B2 | 1/2015 | Shin et al. |
| 9,039,304 B2 | 5/2015 | Ko et al. |
| 9,099,581 B2 | 8/2015 | Na et al. |
| 9,285,554 B2 | 3/2016 | Doany et al. |
| 9,429,725 B2 | 8/2016 | Shao et al. |
| 9,442,255 B2 | 9/2016 | Pommer et al. |
| 9,496,248 B2 | 11/2016 | Lee et al. |
| 9,500,821 B2 | 11/2016 | Hochberg et al. |
| 9,563,028 B2 | 2/2017 | Contag |
| 9,698,564 B1 | 7/2017 | Shubin et al. |
| 9,703,041 B2 | 7/2017 | Smith et al. |
| 9,791,645 B2 | 10/2017 | Meadowcroft et al. |
| 9,804,334 B2 | 10/2017 | Israel et al. |
| 9,804,348 B2 | 10/2017 | Badihi et al. |
| 9,864,133 B2 | 1/2018 | Patel et al. |
| 9,874,688 B2 | 1/2018 | Doerr et al. |
| 9,946,028 B2 | 4/2018 | Chen et al. |
| 10,054,740 B2 | 8/2018 | Chetrit et al. |
| 10,069,279 B2 | 9/2018 | Malcolm et al. |
| 10,222,552 B2 | 3/2019 | Djordjevic et al. |
| 10,481,334 B2 | 11/2019 | Israel et al. |
| 10,502,905 B1 * | 12/2019 | Mathai ................ G02B 6/3845 |
| 10,754,107 B2 | 8/2020 | Li et al. |
| 10,866,363 B2 | 12/2020 | Israel et al. |
| 11,394,468 B2 | 7/2022 | Zhou et al. |
| 11,448,836 B2 | 9/2022 | Ji et al. |
| 11,585,991 B2 | 2/2023 | Israel et al. |
| 2002/0079430 A1 | 6/2002 | Rossi |
| 2002/0118907 A1 | 8/2002 | Sugama et al. |
| 2002/0131180 A1 | 9/2002 | Goodman |
| 2002/0150320 A1 | 10/2002 | Kato |
| 2002/0164129 A1 | 11/2002 | Jackson |
| 2003/0002809 A1 | 1/2003 | Jian |
| 2003/0043157 A1 | 3/2003 | Miles |
| 2003/0044118 A1 | 3/2003 | Zhou et al. |
| 2003/0142896 A1 | 7/2003 | Kikuchi et al. |
| 2003/0222282 A1 | 12/2003 | Fjelstad et al. |
| 2004/0114869 A1 | 6/2004 | Fike et al. |
| 2004/0144869 A1 | 7/2004 | Hennessy |
| 2004/0184704 A1 | 9/2004 | Bakir et al. |
| 2005/0025430 A1 | 2/2005 | Bhagavatula et al. |
| 2005/0162853 A1 | 7/2005 | Jain |
| 2005/0164131 A1 | 7/2005 | Yokouchi |
| 2005/0276613 A1 | 12/2005 | Welch et al. |
| 2006/0239605 A1 | 10/2006 | Palen et al. |
| 2006/0251360 A1 | 11/2006 | Lu et al. |
| 2006/0280402 A1 | 12/2006 | Xia et al. |
| 2007/0103682 A1 | 5/2007 | Yoo |
| 2007/0160321 A1 | 7/2007 | Wu et al. |
| 2007/0223540 A1 | 9/2007 | Sudmeyer et al. |
| 2009/0178096 A1 | 7/2009 | Menn et al. |
| 2009/0262346 A1 | 10/2009 | Egloff et al. |
| 2009/0297093 A1 | 12/2009 | Webster et al. |
| 2010/0002987 A1 | 1/2010 | Hata et al. |
| 2010/0086255 A1 | 4/2010 | Ishizaka |
| 2011/0032598 A1 | 2/2011 | Horikawa et al. |
| 2011/0091167 A1 | 4/2011 | Nishimura |
| 2011/0170825 A1 | 7/2011 | Spector et al. |
| 2011/0280573 A1 | 11/2011 | Collings et al. |
| 2011/0293281 A1 | 12/2011 | Sakurai |
| 2012/0002284 A1 | 1/2012 | McColloch et al. |
| 2012/0063721 A1 | 3/2012 | Chen |
| 2012/0280344 A1 | 11/2012 | Shastri et al. |
| 2013/0044977 A1 | 2/2013 | Amit |
| 2013/0109083 A1 | 5/2013 | Adan |
| 2013/0129281 A1 | 5/2013 | Son et al. |
| 2013/0156370 A1 | 6/2013 | Kim et al. |
| 2013/0182998 A1 * | 7/2013 | Andry ................ G02B 6/4204 385/33 |
| 2013/0216180 A1 | 8/2013 | Tan et al. |
| 2014/0023098 A1 | 1/2014 | Clarkson et al. |
| 2014/0064559 A1 | 3/2014 | Sugasawa et al. |
| 2014/0176958 A1 | 6/2014 | Flanders et al. |
| 2014/0203175 A1 | 7/2014 | Kobrinsky et al. |
| 2014/0226988 A1 | 8/2014 | Shao et al. |
| 2014/0294342 A1 | 10/2014 | Offrein et al. |
| 2014/0363165 A1 | 12/2014 | Panotopoulos et al. |
| 2015/0050019 A1 | 2/2015 | Sengupta |
| 2015/0124336 A1 | 5/2015 | Kaufman |
| 2015/0125110 A1 | 5/2015 | Anderson et al. |
| 2015/0155423 A1 | 6/2015 | Matsuoka et al. |
| 2016/0109659 A1 | 4/2016 | Jiang |
| 2016/0119064 A1 | 4/2016 | Yamaji et al. |
| 2016/0131848 A1 | 5/2016 | Svilans |
| 2016/0161686 A1 | 6/2016 | Li et al. |
| 2016/0195677 A1 | 7/2016 | Panotopoulos et al. |
| 2016/0225477 A1 | 8/2016 | Banine et al. |
| 2016/0246004 A1 | 8/2016 | Kachru et al. |
| 2016/0306117 A1 | 10/2016 | Middlebrook et al. |
| 2016/0377821 A1 | 12/2016 | Vallance et al. |
| 2017/0017042 A1 | 1/2017 | Menard et al. |
| 2017/0017043 A1 | 1/2017 | Menard et al. |
| 2017/0102503 A1 | 4/2017 | Israel et al. |
| 2017/0131469 A1 | 5/2017 | Kobrinsky et al. |
| 2017/0160481 A1 | 6/2017 | Ling et al. |
| 2017/0207600 A1 | 7/2017 | Klamkin et al. |
| 2017/0294760 A1 | 10/2017 | Shubin et al. |
| 2018/0031791 A1 | 2/2018 | Israel et al. |
| 2018/0045891 A1 | 2/2018 | Israel et al. |
| 2018/0061691 A1 | 3/2018 | Jain et al. |
| 2018/0180829 A1 | 6/2018 | Gudeman |
| 2018/0217341 A1 | 8/2018 | Smith et al. |
| 2018/0259710 A1 | 9/2018 | Stabile et al. |
| 2018/0364426 A1 | 12/2018 | Ten Have et al. |
| 2019/0146162 A1 | 5/2019 | Evans |
| 2019/0170937 A1 | 6/2019 | Menezo et al. |
| 2019/0265421 A1 | 8/2019 | Ji et al. |
| 2019/0324211 A1 * | 10/2019 | Israel ................ G02B 6/305 |
| 2019/0339450 A1 | 11/2019 | Noriki et al. |
| 2020/0278508 A1 * | 9/2020 | Israel ................ G02B 6/4214 |
| 2020/0326491 A1 | 10/2020 | Psaila et al. |
| 2020/0357721 A1 | 11/2020 | Sankman et al. |
| 2021/0149128 A1 | 5/2021 | Schaevitz et al. |
| 2021/0165165 A1 | 6/2021 | Israel et al. |
| 2021/0239920 A1 | 8/2021 | Vallance et al. |
| 2021/0263216 A1 | 8/2021 | Bishop et al. |
| 2021/0392419 A1 | 12/2021 | Meister et al. |
| 2022/0026649 A1 | 1/2022 | Vallance et al. |
| 2022/0226649 A1 | 7/2022 | Shalev et al. |
| 2022/0390693 A1 | 12/2022 | Krähenbühl et al. |
| 2022/0404546 A1 | 12/2022 | Krichevsky et al. |
| 2023/0018654 A1 | 1/2023 | Winzer et al. |
| 2023/0021871 A1 | 1/2023 | Kuznia et al. |
| 2023/0030105 A1 | 2/2023 | Aalto |
| 2023/0043794 A1 | 2/2023 | Winzer et al. |
| 2023/0072926 A1 | 3/2023 | Morrison et al. |
| 2023/0077979 A1 | 3/2023 | Winzer |
| 2023/0079458 A1 | 3/2023 | Debergh et al. |

(56) References Cited

U.S. PATENT DOCUMENTS

| | | | |
|---|---|---|---|
| 2023/0084003 | A1 | 3/2023 | Taha et al. |
| 2023/0094780 | A1 | 3/2023 | Testa et al. |
| 2023/0130045 | A1 | 4/2023 | Taha et al. |

FOREIGN PATENT DOCUMENTS

| | | |
|---|---|---|
| CN | 104459890 A | 3/2015 |
| EP | 2639978 A1 | 9/2013 |
| EP | 3316012 A1 | 5/2018 |
| EP | 3495861 A1 | 6/2019 |
| EP | 3521879 A1 | 8/2019 |
| EP | 4102273 A1 | 12/2022 |
| JP | 6462596 B2 | 1/2019 |
| KR | 20050007459 A | 1/2005 |
| KR | 20170081265 A | 7/2017 |
| RU | 2438209 C1 | 12/2011 |
| RU | 2485688 C2 | 6/2013 |
| RU | 2577669 C2 | 3/2016 |
| WO | 2001067497 A1 | 9/2001 |
| WO | 2013048730 A1 | 4/2013 |
| WO | 2018067703 A1 | 4/2018 |
| WO | 2018140057 A1 | 8/2018 |

OTHER PUBLICATIONS

Tom Mitcheltree and Stephen Hardy. "Optical Connectivity Considerations for Co-Packaged Optics". Time Stamp: 23:42. May 6, 2021. https://event.webcasts.com/viewer/event.jsp?ei=1459224&tp_key=61326889cd.
USCONEC. "13950, Ferrule, PRIZM@LT 12F MM" https://www.usconec.com/products/ferrule-prizm-lt-12f-mm.
USCONEC. "15214, Mechanical Optical Interface (MOI) 10+ Gbps, PRIZM® LightTurn®". https://www.usconec.com/products/mechanical-optical-interface-moi-10plus-gbps-prizm-lightturn.
USCONEC. "15215, PRIZM®LightTurn® Mini HOusing" https://www.usconec.com/products/prizm-lightturn-mini-housing.
USCONEC. "16349, Ferrule, PRIZM@LT 8F SM" https://www.usconec.com/products/ferrule-prizm-lt-8f-sm.
USCONEC. "Product Catalog" pp. 69 and 70. https://www.usconec.com/umbraco/rhythm/protectedfilesapi/download?path=%2ffiles%2fLiterature%2fUS_Conec_Product_catalog.pdf.
USCONEC. Mechanical Optical Interface Customer Drawings. https://www.usconec.com/umbraco/rhythm/protectedfilesapi/download?path=%2ffiles%2fdrawings%2fC15214.pdf.
Barwicz, et al., "Assembly of Mechanically Compliant Interfaces Between Optical Fibers and Nanophotonic Chips", IEEE 64th Electronics Components and Technology Conference, Orlando, Fl., May 27-30, 2014.
Bogaerts, "Helios Lecture: Coupling Light to Silicon Photonic Circuits", Silicon Photonics—PhD Course prepared within FP7-224312 Helios Project, Ghent University—IMECGhent, Belgium, Nov. 2009.
CAMAPA, CD-ROM, pp. 58, 59, 79, Russia, 2012.
Chrical Photonics., "Fiber Coupler Overview", Pinebrook, NJ, Jan. 2013.
Cunningham, et al., "Aligning Chips Face-to-Face for Dense Capacitive and Optical Communications", IEEE Transactions on Advanced Packaging, vol. 33, No. 2, May 2010.
First Chinese Foreign Office Action for Chinese Application No. 201980025948.3, Chinese National Intellectual Property Administration (CNIPA), Beijing City, China, Dated: Nov. 15, 2021.
Foreign Office Action and Search Report for ROC (Taiwan) Patent Application No. 105121625 dated Sep. 5, 2017 from IPO (Intellectual Property Office) of Taiwan.
Hou, et al., "Physics of Elliptical Reflectors at Large Reflection and Divergence Angles I: Their Design for Nano-Photonic Integrated Circuits and Application to Low-loss Low-crosstalk Waveguide Crossing", Northwestern University, Evanston, IL., Apr. 2012.
International Search Report and Written Opinion of Internationl Searching Authority for PCT/US2019/027871, ISA/RU, Moscow, Russia, Dated: Aug. 22, 2019.
Kopp, et al., "Silicon Photonic Circuits: On-CMOS Integration, Fiber Optical Coupling, and Packaging", IEEE Journal of Selected Topics in Quantum Electronics, Aug. 2010.
Kurata, et al., "Prospect of Chip Scale Silicon Photonics Transceiver for High Density Multi-mode Wiring System", Photonics Electronics Technology Research Association (PETRA), Japan, 2015, pp. 1-7.
Nguyen, et al., "Silicon-based Highly-efficient Fiber-to-waveguide Coupler for High Index Contrast Systems", Applied Physics Letters, American Institute of Physics, downloaded Feb. 29, 2012, published online Feb. 24, 2006.
Notice of Deficiencies for EP Application No. 16854021.9 dated Jun. 24, 2019, EPO, Rijswijk, Netherlands.
O'Brien, "Silicon Photonics Fiber Packaging Technology", Photonics Packaging Group, Tyndall National Institute, Cork, Ireland, Sep. 2012.
PCL Connections LLC, all rights reserved, "In-Line Coupling Element (ICE) for Bonded Grating Coupling to Silicon PICs", Columbus, OH., May 2013.
The European Search Report for EP Application No. 16854021.9 dated Aug. 21, 2018, EPO, The Hague.
The First Chinese Office Action for Chinese Patent Application No. 2016800557192, Aug. 22, 2019, China, CNIPA
The International Search Report and The Written Opinion for PCT/US2016/038047, ISA/RU, Moscow, Russia, Date of Mailing: Oct. 13, 2016.
The International Search Report and The Written Opinion for PCT/US2017/055146, ISA/RU, Moscow, Russia, Date of Mailing: Jan. 31, 2018.
Zimmerman, "State of the Art and Trends in Silicon Photonics Packaging", Silicon Photonics Workshop, Technische Universitat Berlin, May 2011.
Second Chinese Foreign Office Action for Chinese Application No. 2019800259483, Chinese National Intellectual Property Administration (CNIPA), Beijing City, China, Dated: May 31, 2022.
Noriki et al., "45-degree curved micro-mirror for vertical optical I/O of silicon photonics chip," Optics Express, vol. 27, No. 14, Dated: Jul. 8, 2019.
The International Search Report and the Written Opinion for PCT Application No. PCT/IL2022/051131, ISA/IL dated Jan. 12, 2023.
Miller, David "Self-aligning optics for integrated mode separation," Standfor University, IEEE 2015.
Francis, David G. "Laser Instrumentation in AEDC Test Facilities," Arnold Engineering Development Center, Dec. 1971.
McLaughlin, Dennis K. "Laser Doppler Velocmeter Measurements in a Turbulent Jet Exiting into a Cross Flow," Arnold Engineering Development Center, Jan. 1972.
The International Search Report and the Written Opinion for PCT Application No. PCT/IL2022/051360, ISA/IL dated Mar. 5, 2023.
The International Search Report and the Written Opinion for PCT Application No. PCT/IL2022/051358, ISA/IL dated Apr. 2, 2023.
Notice of Preliminary Rejection dated Jul. 19, 2023 for KR Application No. 10-2018-7007767.
Doerr et al. Silicon photonic integrated circuit for coupling to a ring-core multimode fiber for space-division mutliplexing. Bell Laboratories. ECOC Postdeadline Papers. 2011 OSA. (Year: 2011).
The International Search Report and the Written Opinion for PCT Application No. PCT/IL2023/051163, ISA/IL dated Jan. 11, 2024.

\* cited by examiner

BACKSIDE OPTICAL CONNECTOR

TECHNICAL FIELD

The present disclosure relates generally to coupling an optical fiber connector to a silicon photonics chip, and more particularly to where the coupling is done through the bottom of the silicon photonics chip.

BACKGROUND

Communications systems and datacenters are required to handle massive data at ever increasing speeds and ever decreasing costs. This often requires a large amount of space and entails high power consumption. To meet these demands, optical fibers and optical integrated circuits (ICs) such as, for example, a silicon photonics (SiPh) chip or integrated optical circuit, are used together with high speed electronic ICs. A SiPh chip is a device that integrates multiple photonic functions in a manner that is similar to the way an electronic IC or radio frequency (RF) IC integrates different electronic or RF functions onto a single chip. SiPh chips are typically fabricated using indium phosphide or silicon dioxide ($SiO_2$), which allows for the integration of various optically active and passive functions on the same chip.

The coupling of SiPh chips to optical fibers is not as well advanced as the integration and/or coupling of off-chip electronics to ICs. Specifically, the challenges facing the making of optical connections to a SiPh chip are much more complex than merely connecting wire connections to electronic ICs which may be mounted on a printed circuit board (PCB). Some difficulties of connecting optical fibers to a SiPh chip are inherent in the characteristics of optical packaging such as the assembly tolerance between SiPh chip and the fiber connector.

Other challenges arise from the fact that the SiPh chip, like application specific integrated circuit chips (ASICs), is often flip-chip mounted when being mounted to a substrate such as a multichip module (MCM) or an interposer thereon. Such flip-chip mounting makes it difficult to couple light between fiber and the SiPh chip because the silicon photonics couplers are usually inaccessible once the SiPh chip is flipped One prior art approach is to make a "balcony" so that the fibers can be attached from below, i.e., below the bottom of the SiPh chip, which is facing upward due to the flipping of the SiPh chip. Another prior art approach is to use a "thin" SiPh chip and use electrical vias to conduct current to the SiPh so the SiPh is not flipped and can still be accessed optically from the top.

Yet a further prior art approach uses grating couplers to achieve backside coupling. A problem with the grating coupler arrangements is that the light has to pass through the different layers of the SiPh chip, which is generally relatively thick, and hence there is a loss of light as light passes through the SiPh chip which limits the efficiency of transmission. In addition, there is further inefficiency of transmission due to back reflections and other distortions.

It would therefore be advantageous to provide a fiber-to-chip optical coupling solution that would overcome the deficiencies of the existing solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a connector for use in coupling an optical signal between an optical fiber in an optical plug mounted to a bottom of a silicon photonics (SiPh) chip, comprising: a curved mirror; and a tilted flat mirror; wherein at least one of the curved mirror and the tilted flat mirror is formed on a hardened stamped imprint material that was deposited on the SiPh chip at least in a cavity thereof.

Certain embodiments disclosed herein include a connector for use in coupling an optical signal between an optical fiber in an optical plug mounted to a bottom of a silicon photonics (SiPh) chip, comprising: at least one curved mirror; and at least one tilted mirror; wherein the at least one curved mirror and the at least one tilted mirror is formed on a hardened stamped imprint material placed at least partly in a cavity of the SiPh chip.

Certain embodiments disclosed herein include a connector for use in coupling an optical signal between an optical fiber in an optical plug mounted to a bottom of a silicon photonics (SiPh) chip, comprising: at least one curved mirror; and
  at least one grating coupler; wherein the at least one curved mirror is formed on a hardened stamped imprint material placed at least partly in a cavity of the SiPh chip; and wherein the grating coupler is adapted to couple light with a wave guide of the SiPh chip.

DETAILED DESCRIPTION

Figure 1:
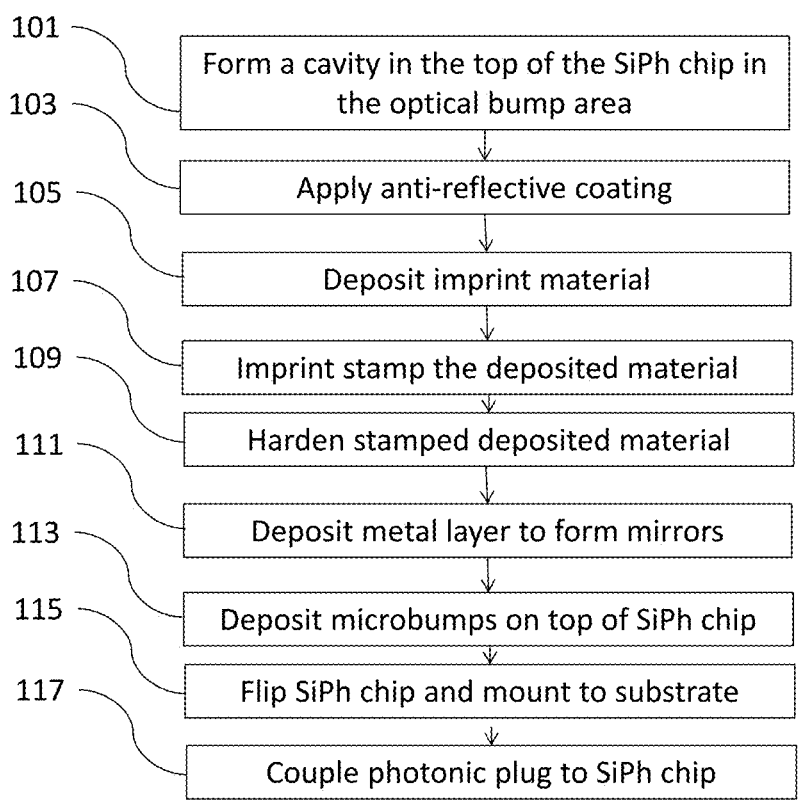
FIG. 1 shows an illustrative process for making a structure and coupling of single-mode fiber to a silicon photonics chip that is flip-chip mounted using backside optical coupling.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

To provide for simplicity of description, the "bottom" of the SiPh chip will always refer to herein to the bottom surface of the SiPh chip prior to the SiPh chip being flipped. The bottom surface of the SiPh chip is typically the surface of the SiPh chip opposite that on which the optical circuitry is developed. Similarly, for simplicity of description, the "top" of the SiPh chip will always refer to herein to the top surface of the SiPh chip prior to the SiPh chip being flipped. The top surface of the SiPh chip is typically the surface of the SiPh chip on which the optical circuitry is developed.

To avoid the problems stated above, the thickness of the optical chip is turned from a disadvantage to an advantage for a flip-chip mounted SiPh chip by a unique structure and arrangement of optical components including a photonic plug so that light from a single-mode fiber that is being coupled to an SiPh chip need pass through only a portion of the thickness of the SiPh chip's substrate. To this end, a cavity is etched out of the top of the substrate of the SiPh chip in an area of the SiPh chip referred to as a photonic bump and a tilted flat mirror and a curved mirror are formed by stamping and curing an imprint material placed in and possibly over the cavity. A photonic plug including a tilted flat mirror and a curved mirror is placed over a spacer which is in turn over the bottom of the flipped SiPh chip in the area of the photonic bump. The one or more fibers for which light is to be coupled with the SiPh chip are fixed to the photonic plug. The resulting optical path couples light between the optical fiber and the SiPh chip.

Note that the structures of the photonic bump portion of the SiPh chip need not be manufactured at the same time that the SiPh chip is manufactured. Therefore, the structures of such a photonic bump can be added by another party, i.e., a party who did not manufacture the rest of SiPh chip.

The bottom of the SiPh chip and the photonic plug may be arranged such that the photonic plug is detachable from the SiPh chip.

Unless otherwise explicitly specified herein, the drawings are not drawn to scale. Also, identically numbered components within different ones of the FIGs. refer to components that are substantially the same.

FIG. 1 shows an illustrative process for making a structure and coupling of single-mode fiber to a silicon photonics chip that is flip-chip mounted using backside optical coupling.

Figure 2:
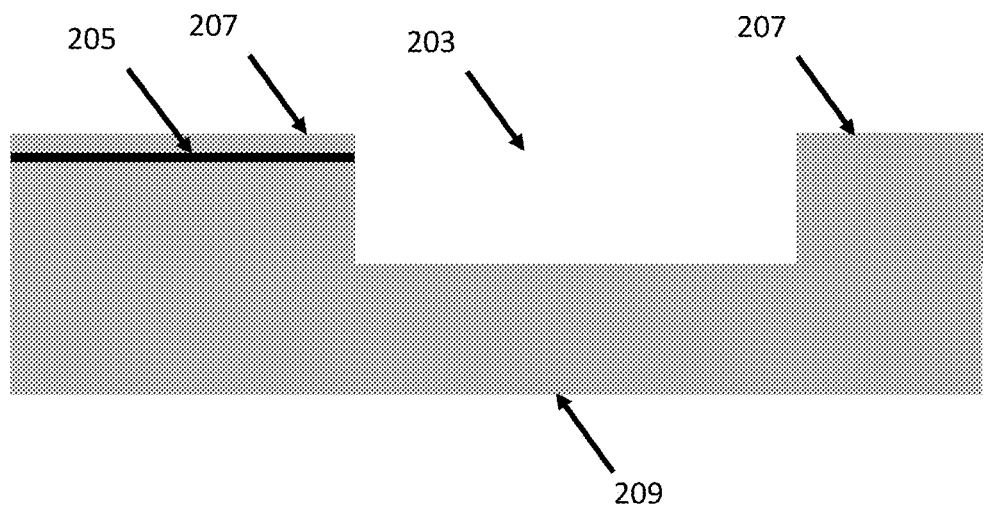
FIG. 2 shows an illustrative cavity formed in the top of a SiPh chip.

In step 101, a cavity is formed in the top of a SiPh chip in the optical bump area. The cavity may be formed by etching down from the top of the SiPh chip. FIG. 2 shows an illustrative such cavity 203 as having been formed in top 207 of SiPh chip 201. SiPh chip 201 already, e.g., prior to formation of the cavity, may have waveguide 205 formed thereon. Cavity 203 typically has a depth in the range of 10 to 20 microns while it may have a width in a range from 150 microns to a few hundred microns. In an illustrative embodiment, the width may be 200 microns. Although only one cavity is shown, it will be appreciated by those of ordinary skill in the art that more than one cavity may be employed, e.g., one cavity per fiber to be coupled to the SiPh chip. Alternatively, one cavity may be employed for more than one waveguide to be coupled to corresponding fibers. Also shown in FIG. 2 is bottom 209 of SiPh chip 201. Note that the above references to "backside" optical coupling refer to coupling the light at least once through bottom 209 of SiPh chip 201

Figure 3:
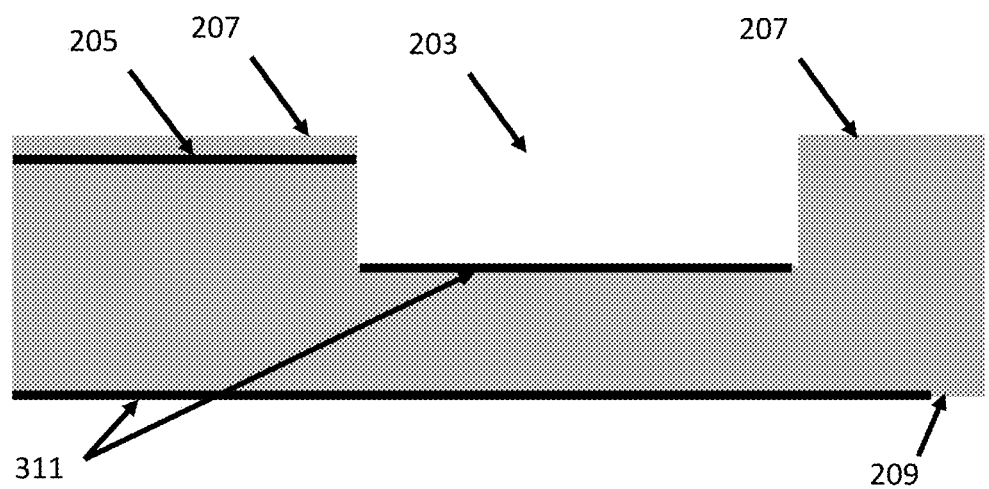
FIG. 3 shows antireflective coating layers are applied along the bottom of the cavity of FIG. 2 and also along a portion of the bottom of the SiPh chip.

Next, as seen in FIG. 3, antireflective coating layers 311 are applied along the bottom of cavity 203 and also along a portion of bottom 209 of SiPh chip 201, at least under the portion of bottom 209 that is under cavity 203, in step 103. Such antireflective coating may be a dielectric material such as a layer of magnesium fluoride, although those of ordinary skill in the art will be able to select an antireflective coating suitable to the materials and structure employed which is described further hereinbelow.

Advantageously, the antireflective coating layers may substantially overcome the difference, i.e., a mismatch, in the index of refraction as light propagates from one medium to another. Note that in other embodiments that layer of antireflective coating 311 along bottom 209 of SiPh chip 201 may be applied at a different time, e.g., a later time, than layer of antireflective coating 311 along bottom of cavity.

Thereafter, in step 105, a imprint material, e.g., a liquid, suitable to be formed by stamping is deposited on SiPh chip 201 and at least in cavity 203 thereof. The deposited imprint material may also extend over at least a portion of top 207 of SiPh chip 201. One material that may be used as the imprint material is a siloxane, which may be obtained from INKRON or other well known sources which is a UV sensitive resin used for nanoimprinting. The imprint material should be such that it is substantially transparent to light at the wavelength or wavelengths of interest after it hardens. Imprint materials and stamping are well known in the art and may be selected at the discretion of the implementer for the particular application.

Figure 4:
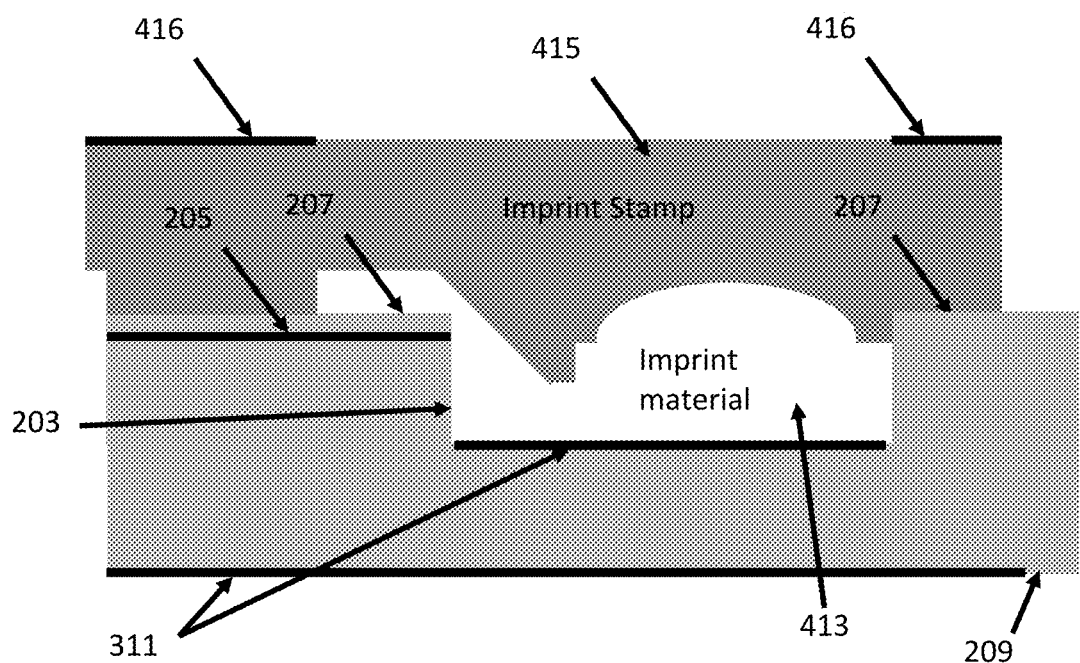
FIG. 4 shows imprint material in the cavity of FIG. 2.

An imprint stamp is then employed in step 107 to shape the imprint material to have a curved surface and a tilted flat surface suitable to be used as a base for a curved mirror and a tilted flat mirror respectively. FIG. 4 shows imprint material 413 in cavity 203 and also some imprint material being on top 207 of SiPh chip 201 along with imprint stamp 415 such as may be used in step 107.

The imprint material is then hardened in step 109, such as by curing, which may be through the use of a catalyst, e.g., ultraviolet (UV) light, heat, and so forth as well as combinations of the forgoing, so as to retain the imprinted shape. To this end, when the catalyst employed is UV light, prior to exposing the imprint material to the UV light, mask 416 of FIG. 4 is employed to block UV light from reaching areas of SiPh chip 201 on which the imprint material was deposited but which are not desired to be hardened. Mask 416 should block the catalyst from reaching the imprint material, e.g., when the catalyst is UV light mask 416 may be made of UV light blocking metal, e.g., bronze, as is well known in the art. Mask 416 may be a part of imprint stamp 415 or it may be separate there from and placed on top of imprint stamp 415. After hardening of the desired portion of the imprint the material, mask 416 and imprint stamp 415 may be removed and then any non-hardened imprint material, e.g., that which was under mask 416 may be cleaned away.

Figure 5:
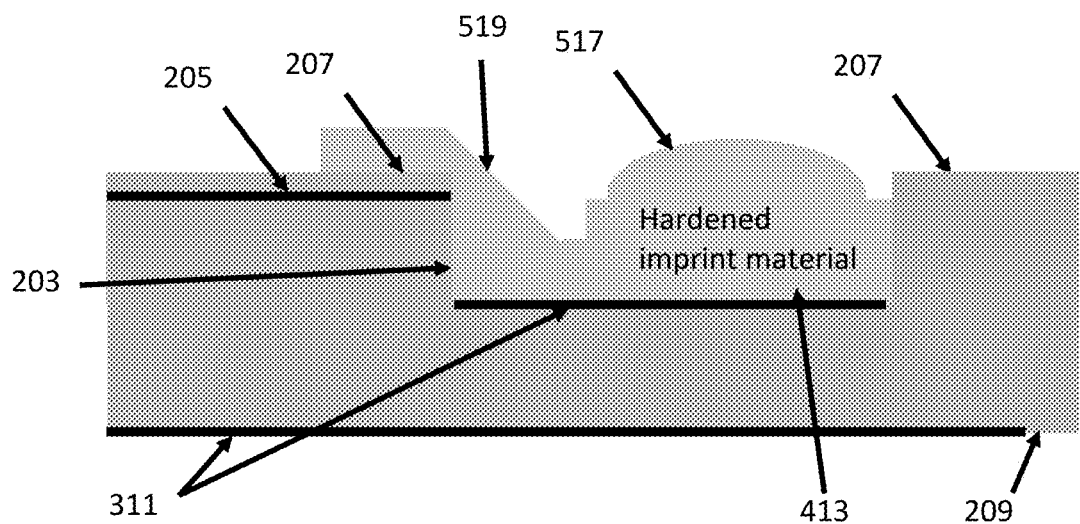
FIG. 5 shows the shaped and hardened imprint material of FIG. 4.

FIG. 5 shows the shaped and hardened imprint material 413 with curved surface 517 and tilted flat surface 519 after the non-hardened imprint material is cleaned away.

Figure 6:
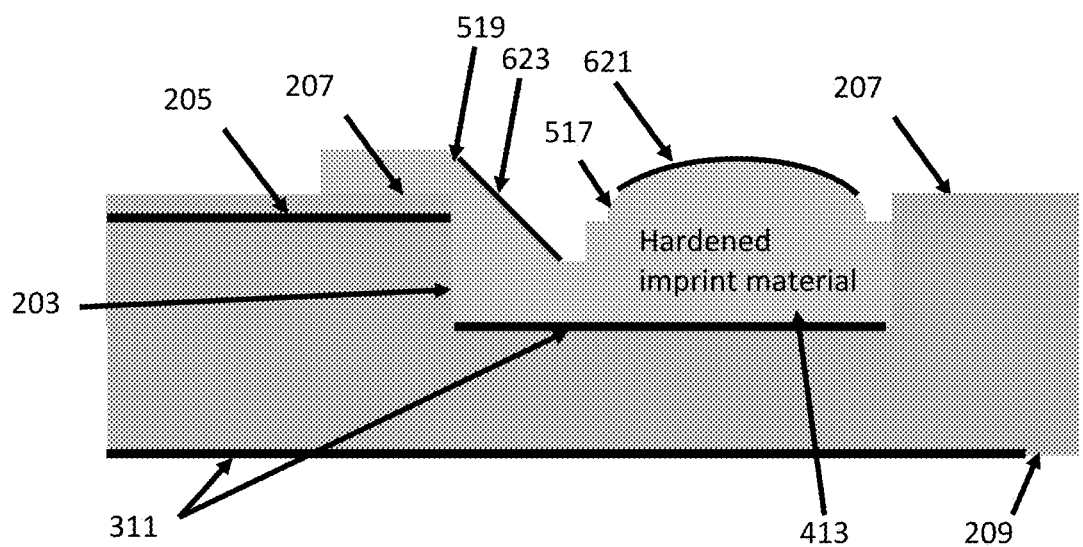
FIG. 6 shows reflective material deposited on the shaped and harden imprint material of FIG. 5 to form mirrors.

Thereafter, in step 111, a reflective material, e.g., metal, is deposited over at least a portion of curved surface 517 and a portion of tilted flat surface 519. The metal deposited is selected so as to be reflective to the light of interest and to thereby form curved mirror 621 and tilted flat mirror 623 shown in FIG. 6. In one embodiment, e.g., where the wavelength of light is light in the 1200-1600 nm region the metal employed may be gold or copper. Those of ordinary skill in the art will readily be able to select appropriate materials that correspond to their particular wavelengths of interest. The curve of imprint stamp 415 that is used to form curved surface 517 should conform to the desired shape of curved mirror 621 and the portion of imprint stamp 415 that is used to form tilted flat surface 519 should conform to the desired shape and tilt of tilted flat mirror 623. In the description hereinbelow, curved mirror 621 may be referred to as first curved mirror 621 and tilted flat mirror 623 may be referred to as first tilted flat mirror 623.

Figure 7:
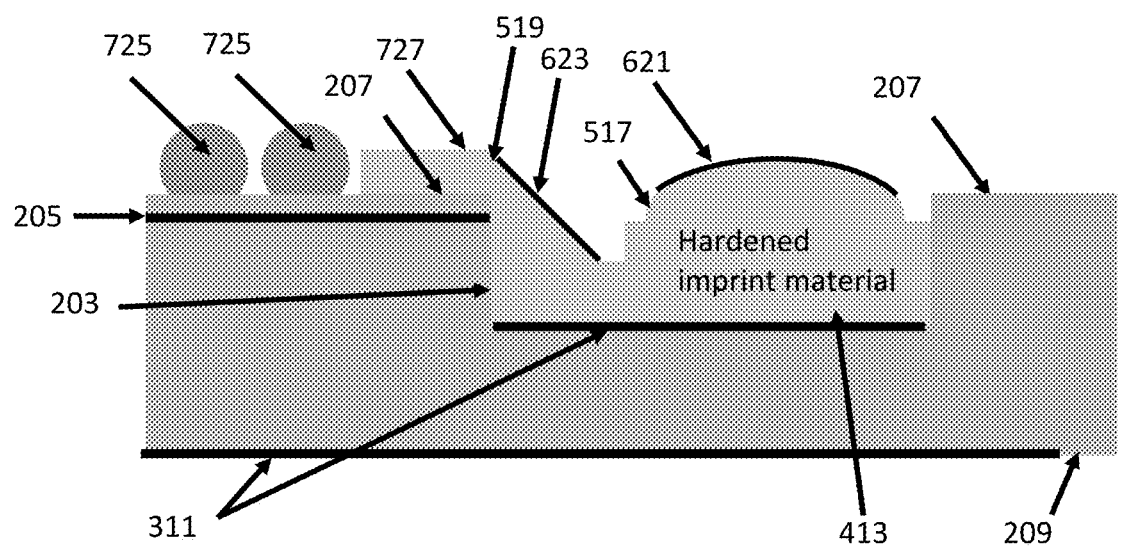
FIG. 7 shows the structure of FIG. 6 with electrical microbumps placed on top of the SiPh chip.

Next, in step 113, electrical microbumps are deposited on top 207 of SiPh chip 201. The electrical microbumps, are employed at least to couple SiPh chip 201 to a substrate when SiPh chip 201 is flipped and placed against a substrate. In one embodiment, the electrical microbumps may be a type of metal, e.g., solder, that is placed on conductive pads, e.g., metallic pads, such as copper, or another conductive substance, on top 207 of SiPh chip 201 and then reflowed when SiPh chip 201 is flipped and placed on the substrate to which it is being mounted. FIG. 7 shows the structure of FIG. 6 with electrical microbumps 725 placed on top 207 of SiPh chip 201. In one embodiment, electrical microbumps 725 are high enough so that they will extend beyond top portion 727 of the structured formed of hardened imprint material 413. In one embodiment, one or more of microbumps 725 may consist of a downsized copper pillar and solder with height of, for example, around 30 μm. The pads on which microbumps 725 are placed are not shown but are well known in the art.

Figure 8:
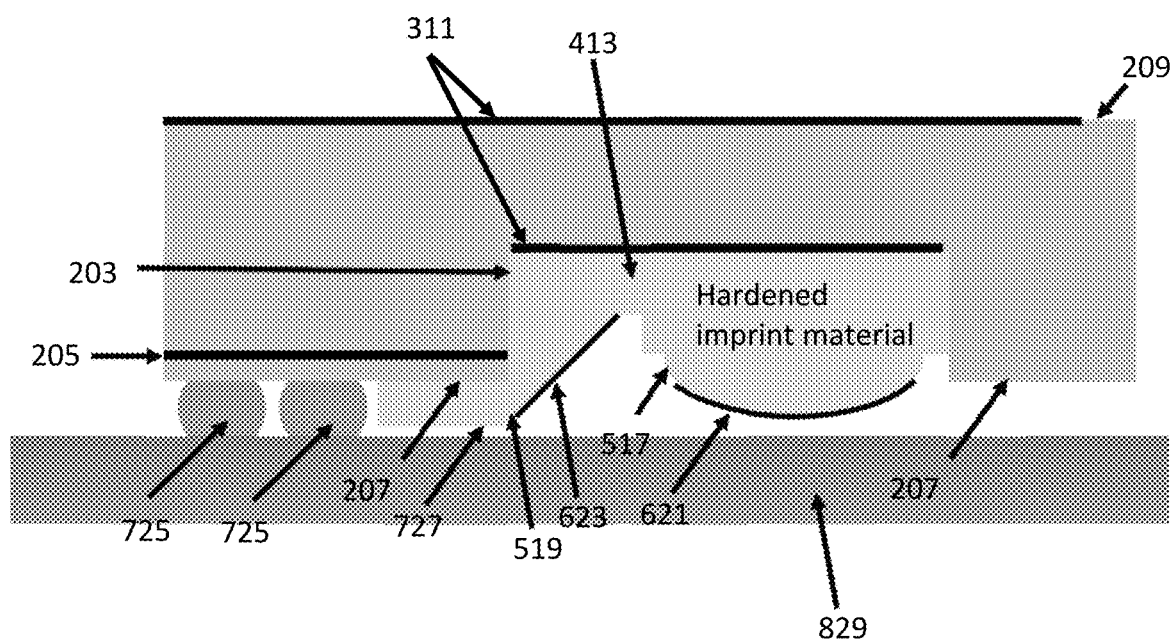
FIG. 8 shows the SiPh chip flipped and mounted to a substrate.

In step 115, SiPh chip 201 is flipped and mounted to a substrate. The substrate may have additional devices, e.g., optical and or electrical devices, mounted thereon as well. In one embodiment, the substrate may be an interposer that is then further mounted to a substrate. SiPh chip may be attached to the substrate by reflowing the microbumps. FIG. 8 shows SiPh chip 201 flipped and mounted to substrate 829 after reflow of solder microbumps 725. In one embodiment, there are conductive pads, e.g., metallic pads, such as copper, or another conductive substance, on the substrate, e.g., substrate 829. The pads of substrate 829 are not shown but are well known in the art.

In one embodiment, substrate 829 may be a multichip module (MCM) that provides for various electrical functions. Typically MCM 829 provides the base for multiple chips mounted thereon that perform various electrical and optical functions. For example, one or more silicon photonics chips may be mounted on MCM 829 although in FIG. 8 only SiPh chip 201 is shown as a non-limiting example. One or more electronic circuits, e.g., switches and application specific integrated circuits (ASICs), may also be mounted on MCM 829. MCM 829 may itself be mounted on a board, not shown but well known in the art. As noted, the substrate may be an interposer that is then further coupled to the MCM.

Figure 9:
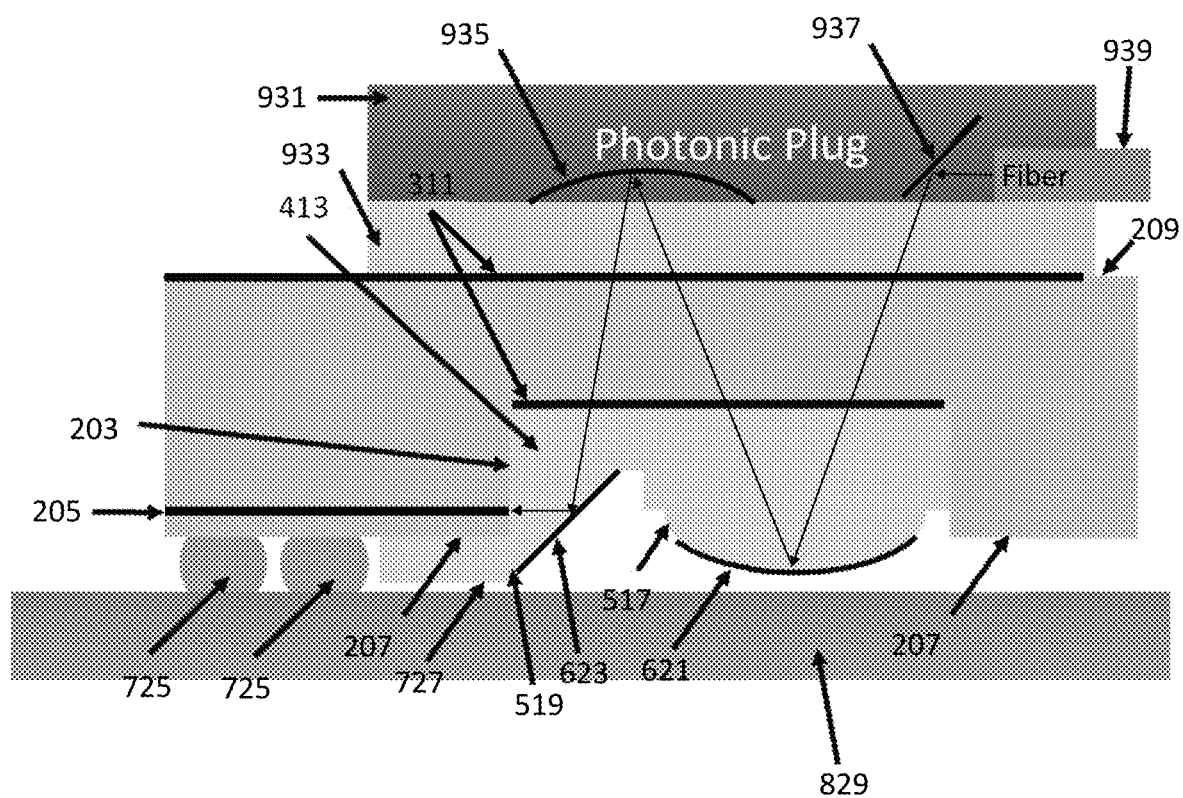
FIG. 9 shows a photonic plug coupled to the bottom of the SiPh chip of FIG. 8.

Lastly, in step 117, a photonic plug is coupled to bottom 209 of SiPh chip 201 with a spacer interposed between the photonic plug and bottom 209. FIG. 9 shows photonic plug 931 so coupled, and more specifically, photonic plug 931 is stacked on top of spacer 933 which is in turn on top of bottom 209 of SiPh chip 201. Photonic plug 931 includes second curved mirror 935 and second tilted flat mirror 937. Optical fiber 939 is inserted into photonic plug 931 so that light may be coupled between optical fiber 939 and second tilted mirror 937. Although only a single optical fiber 939 is shown in FIG. 9, it is expected that generally there will be a plurality of fibers arranged in parallel in the photonic plug, as will be shown and described further hereinbelow. It is generally expected that optical fiber 939 will be a single-mode fiber.

In some embodiments, spacer 933 is glued, e.g., using an adhesive, to photonic plug 931. In some embodiments, spacer 933 is glued, e.g., using an adhesive, to SiPh chip 201. Spacer 933 may be made of any transparent and non-conductive material, such as glass, polydimethylsiloxane, or any other index matching material.

The adhesive should have an appropriate index of refraction so as to minimize optical losses. For example, when optical fiber 939 and spacer 933 are each made from fused silica that has an index of refraction around 1.5, in order to minimize optical losses, the index of refraction of the adhesive should be around 1.5 as well. Those of ordinary skill in the art will readily be able to select an adhesive having an appropriate index of refraction based on the materials employed in their various applications. Spacer 933 is optically transparent to at least one wavelength of light being carried by optical fibers 113 and employed by SiPh chip 201. Spacer 933 may be made of any transparent and non-conductive material, such as glass, polydimethylsiloxane, or any other encapsulation material with appropriate refractive index.

Spacer 933 is used at least in part to control the distance between photonic plug 931 and SiPh chip 201 so as to enable the proper optical operation of the system. Spacer 933 may also be used to at least partially encapsulate and help hold in place optical fiber 939. To this end, in some embodiments an adhesive may be employed between at least a portion of spacer 933 and at least a portion of photonic plug 931 to keep spacer 933 attached to photonic plug 931.

In some embodiments, at least one of first curved mirror 621 and second curved mirror 935 is structured to reflect all wavelengths of light incident thereupon.

Figure 10:
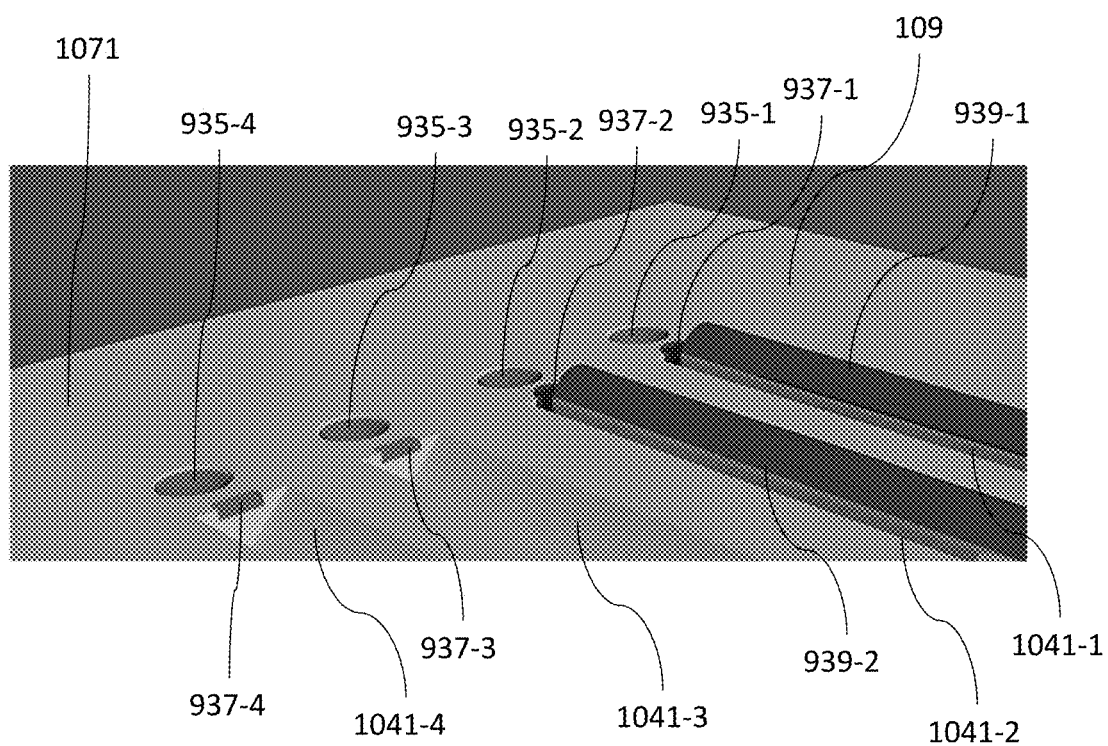
FIG. 10 shows a portion of an illustrative surface usable for a photonic plug.

FIG. 10 shows a portion of an illustrative surface 1071 usable for photonic plug 931 in which second curved mirrors 935 and tilted flat mirrors 937 are formed, each corresponding set of a one of curved mirror 935 and a one of tilted flat mirrors 937 being for a respective one of optical fibers 939. Also, shown in FIG. 10 are trenches, 1041, e.g., V-grooves, for guiding optical fibers 939. FIG. 10 shows four fiber trenches 1041-1 through 1041-4. Each fiber trench 1041 adjoins a corresponding one of second tilted flat mirrors 937, i.e., second tilted flat mirrors 937-1 through second tilted flat mirrors 937-4. In the embodiment shown in FIG. 10 each of fiber trenches 1041 are shaped as a V-groove formed in a substrate layer of photonic plug 931. Each of fiber trenches 1041 may be formed by etching. Each of second tilted flat mirrors 937-1 through 937-4 is oriented so as to be able to direct light between optical fiber 939 and a corresponding respective first curved mirror 621 formed on SiPh chip 201. FIG. 10 also shows four second curved mirrors 935-1 through 935-4. Each of second curved mirrors 935 is oriented so that when photonic plug 931 is coupled to spacer 931 which is in turn coupled to bottom 209 of SiPh chip 201, the interior of each of second curved mirror 935 is facing toward bottom 209 of SiPh chip 201.

It should be noted that only 2 optical fibers 939-1 and 939-2 and four fiber trenches 1041 are shown in FIG. 10 for illustrative purposes only. Other numbers of optical fibers and trenches may be utilized without departing from the scope of the disclosed embodiments. It should be further noted that trenches 1041 are described as V-grooves. However, any type of groove shape can be utilized, such as square, cylinder, diamond, and the like.

FIG. 10 shows optical fibers 939-1 and 939-2 are placed in the fiber trenches 1041-1 and 1041-2, respectively. In one embodiment, the height of at least one of fiber trenches 1041 is substantially the same as the diameter of a one of optical fibers 939 that is placed therein. Doing so with all of fibers 939 enables spacer 933 to have a flat surface that can be flush against photonic plug 931. However, in other embodiments, spacer 933 may be shaped so as to accommodate other heights for fiber trenches 1041. Second tilted flat mirrors 937 and second curved mirrors 935 should be positioned to provide for a proper optical path with respect to the depth and orientation of fiber trenches 1041. The depths of trenches 1041 shown in FIG. 10 and the diameter of fibers 939 shown in FIG. 10 are simply for pedagogical purposes to make it easy to facilitate explanation of the concept and do not reflect any particular preferred or real-world depth, diameter, or optical path.

Processes for creating a fiber trench are well known in the art. In some embodiments, adhesive may also be placed within trenches 1041 or around optical fibers 939 to secure optical fibers 939 with photonic plug 931.

Figure 11:
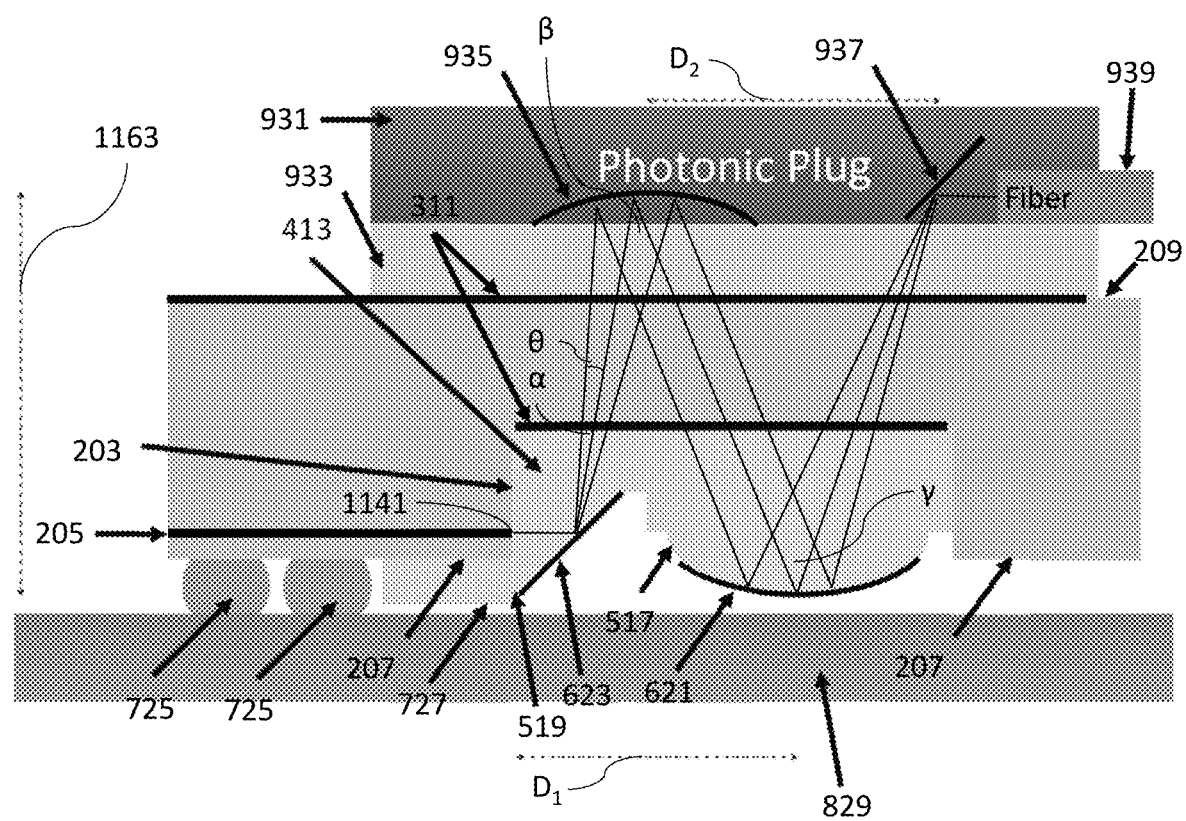
FIG. 11 is an illustrative diagram utilized to describe the angles and distances of the coupling embodiment shown in FIG. 9.

FIG. 11 is an illustrative diagram utilized to describe the angles and distances of the coupling embodiment shown in FIG. 9. In this example, a drain is optical fiber 939 and an exit point of a waveguide of SiPh chip 1141 is the source for the light beam. Note that that the arrangement shown works in the reverse direction as well.

Several adjustable parameters determine the implementation of the arrangement shown in FIG. 11, namely, height of separation 1163, main propagation angles ($\alpha$, $\beta$, $\gamma$), the propagation medium types of the separator 933, SiPh chip 201, and hardened imprint material 413 and a target tolerance for misalignment.

The light beam's radius is determined by the light beam's radius at the source 1141, the medium in which the beam propagates, and the wavelength of the light beam. First, the angle of divergence ($\theta$) is selected as the angle where the intensity of the light beam is 1% of the intensity at the center of the beam. Then, in an exemplary embodiment, the main propagation angles ($\alpha$, $\beta$, $\gamma$) are set to meet the following constraints:

$$2\alpha = \beta$$

$$\beta = \gamma$$

Typically, the value of $\theta$ is 11°-12°. It should be noted that other constraints may be set to different target tolerances. As noted above, the separation height 1163, i.e., the height between curved mirrors 621 and 935, which is made up of the height of spacer 933, part of the height of SiPh chip 201, the height of hardened imprint material 413, and the heights of any antireflective coatings and which is represented as L in the equations below, is set based on the allowed tolerances, e.g., for rotation and leveling errors. In an exemplary embodiment, L equals 300 μm.

In an embodiment, first and second curved mirrors 621 and 935 are designed so that when assembled each mirror's respective centers are located where the main propagation axis intersects each respective mirror. Specifically, the mirrors are designed such that the center of first curved mirror 621 is at a distance $D_1$ from the source 1141. In an embodiment, the distance $D_1$ is computed as follows:

$$D_1 = 2 \times L \times \tan(\alpha);$$

The center of second curved mirror 935 is at a distance $D_2$ from optical fiber 939 acting as the drain. In an embodiment, the distance $D_2$ is computed as follows:

$$D_2 = 2 \times L \times \tan(\gamma)$$

Further, the lateral distance, to have a substantially 0 μm misalignment between first and second curved mirrors 621 and 935, is computed as follows:

$$L \times \tan(\alpha)$$

In an embodiment, first and second curved mirrors 621 and 935 are shaped in such a way that all light beams from the source 1141 are reflected and collimated at the angle $\alpha$ after second curved mirror 935 and focused to optical fiber 939 acting as the drain after being reflected by first curved mirror 621. The surfaces of first and second curved mirrors 621 and 935 are large enough to cover the divergence axis. It should be noted that all calculations are performed under 0 misalignment conditions. Although the embodiments disclosed herein describe the use of curved mirrors for propagating light beams, other arrangements can be realized using other reflective or focusing elements, such as optical lenses, zone plates, e.g., Fresnel zone plates, and the like.

First and second curved mirrors 621 and 935 are placed so that their respective reflective curved surfaces face in opposite directions to each other. Specifically, first curved mirror 621 is on SiPh chip 201 with its curved reflective surface facing generally toward photonic plug 931 while second curved mirror 935 is on photonic plug 931 with its curved reflective surface facing generally toward SiPh chip 201. As a result of the arrangement of the mirrors, light from waveguide 205 of SiPh chip 201 ultimately is directed into fiber 939 and vice-versa, depending on the application.

The total spacing height between SiPh chip 201 and photonic plug 931, and in particular the height between the mirrors, determines, in part, the efficiency of the transference of a light beam, i.e., optical signal, that is propagating along the optical path. Specifically, the greater the total height is, the less the efficient is the transference. Those of ordinary skill in the art will readily be able to determine an appropriate height for the total spacing and each of its component elements. In an exemplary and non-limiting embodiment, the total height is set to 300 μm.

Although the optical path was described regarding a connection between a single fiber and SiPh chip 605, it will be clear to those of ordinary skill in that the illustrative path may be repeated and applied to a plurality of fibers, e.g., all fibers 939 in in photonic plug 931, e.g., as shown in FIG. 10.

Figure 12:
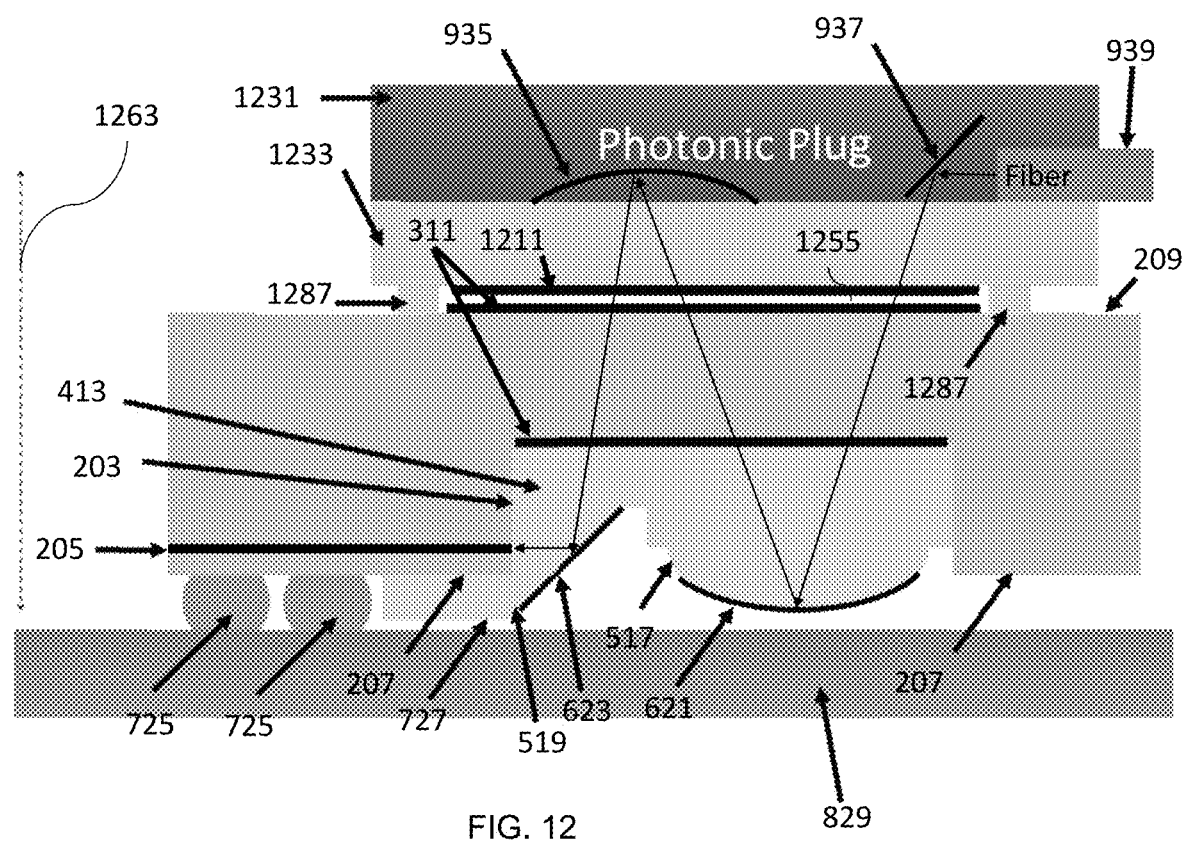
FIG. 12 shows another embodiment that uses a detachable plug die having a spacer.

FIG. 12 shows another embodiment in which fixed photonic plug 931 and spacer 933 are replaced by detachable plug die 1231 and spacer 1233. These may be inserted into receptacle 1481 shown in FIG. 14. Detachable plug die 1231 is described further hereinbelow. Detachable plug die 1231 is detachable due to its ability to be inserted into and correspondingly removed from receptacle 1481.

Due to the use of detachable plug die 1231 and spacer 1233 an additional air gap 1255 results. Such an air gap may necessitate an additional layer of antireflective coating 1211 which may be applied to the surface of spacer 1233 that is facing SiPh chip 201. In addition, the height of separation must now also add in the height of air gap 1255 and antireflective coating 1211 if employed. The new height of separation is shown in FIG. 12 as height of separation 1263, which would be the value of L for such an embodiment in the calculations explained above for determining the geometry of embodiments.

Figure 13:
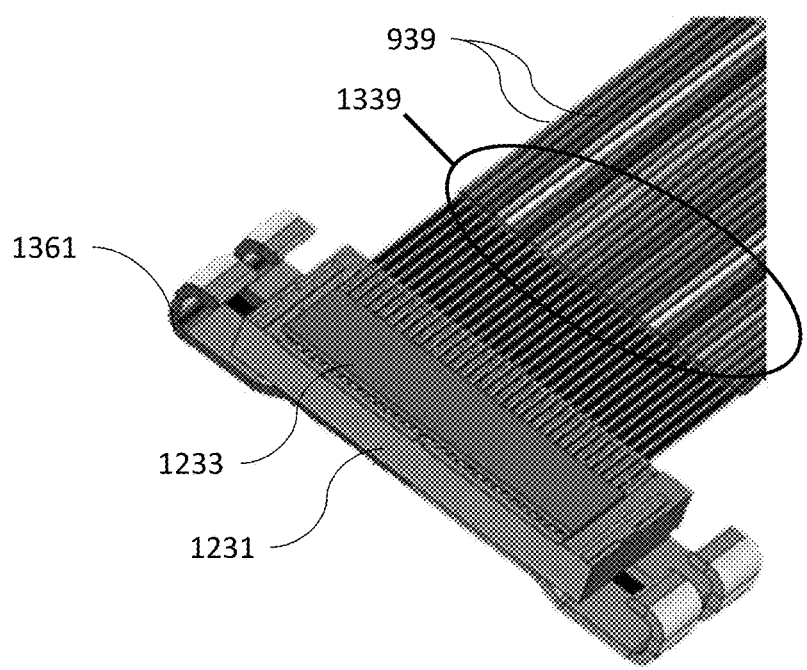
FIG. 13 shows the individual fibers of a fiber ribbon are inserted into trenches as described in FIG. 10.

FIG. 13 shows that the individual fibers 939 of fiber ribbon 1339 are inserted into trenches, e.g., V-grooves, shown, e.g., as described in more detail hereinabove regarding FIG. 10, formed in detachable plug die 1231 to keep them aligned and the trenches are typically in parallel and typically each trench extends part-way across detachable plug die 1231. The trenches hold the fibers and keeps them aligned, which may be in cooperation with spacer 1233 and an adhesive.

Detachable plug die 1231, spacer 1233, and fiber ribbon 1339 taken together may be considered to be a detachable photonic plug that can be used to connect optical signals between SiPh chip 201 and fibers, not shown, to which the opposite end of fiber ribbon connector 1339 are connected, such opposite ends also being not shown. The components of the detachable photonic plug, including detachable plug die 1231, fibers 1339, and spacer 1233 are assembled, e.g., as shown in FIG. 13, prior to being inserted into receptacle 1481. Also shown in FIG. 13 is clip 1361 which is used to hold the detachable photonic plug within receptacle 1481.

As described above, spacer 1233 is used at least in part to control the distance between detachable plug die 1231 and SiPh chip 201 so as to enable the proper optical design of the system. Spacer 1233 may also be used to at least partially encapsulate and help hold in place fibers 939 of fiber ribbon 1339. To this end, in some embodiments an adhesive may be employed between at least a portion of glass spacer 121 and at least a portion of plug die 1231 to keep spacer 1233 attached to plug die 1231. In some embodiments, adhesive may also be placed within the trenches or around optical fibers 939.

The adhesive should have an appropriate index of refraction so as to minimize optical losses, as noted above. Spacer 1233 is optically transparent to at least one wavelength of light being carried by optical fibers 939 and employed by SiPh chip 201. Spacer 1233 may be made of any transparent and non-conductive material, such as glass, polydimethylsiloxane, or any other encapsulation material with appropriate refractive index.

Figure 14:
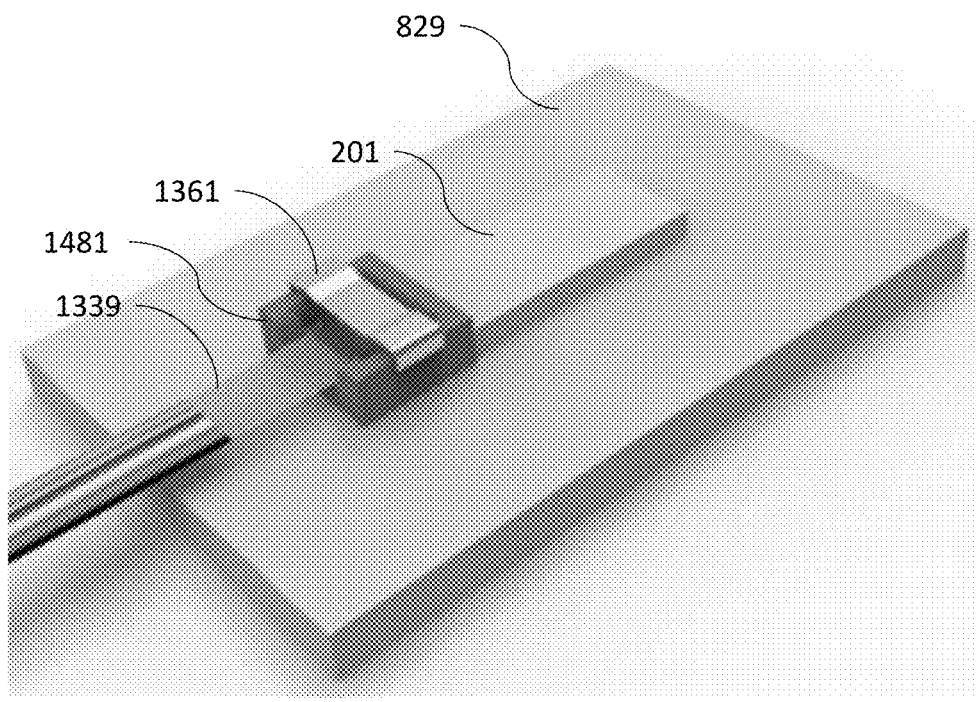
FIG. 14 shows a receptacle mounted on an SiPh chip with a detachable plug die inserted therein.

FIG. 14 shows detachable plug die 1231 and spacer 1233 inserted into receptacle 1481 which is in turn mounted over at least a portion of SiPh chip 201. Receptacle 1481 is reflow soldered or glued, e.g., using an adhesive, to SiPh chip 201, substrate 829, or a combination thereof. This may be performed using a standard pick and place machine and as such, advantageously, it can be placed with high accuracy. It may be placed during the packaging process, e.g., during the placing of one or more chips, e.g., an ASIC on the substrate 829.

FIG. 14 further shows removable clip 1361 over receptacle 1481 so as to hold removable plug die 1231 and spacer 1233 within receptacle 1481. Note that removable clip 1361 substantially blocks detachable plug die 1231 and spacer 1233 from being seen in FIG. 14. Removable clip 1361 extends over the top of receptacle 1481 and may press down on detachable plug die 1231 in order to keep the components in place. In one embodiment, removable clip 1361 extends over the top and around two opposing sides of receptacle 1481 which it grips to stay in position. Receptacle 1481 may have one or more indentations, not shown, to aid clip 1361 to remain in place. In one embodiment, clip 1361 remains in place due to friction. In one embodiment, clip 1361 may be attached to SiPh chip 201 or substrate 829. After being placed, removable clip may be removed to allow detachable plug die 1231 and fibers 939 to be separated from SiPh chip 201. Although shown in the embodiments herein as being fully detachable, those of ordinary skill in the art will readily recognize that at least one end of clip 1361 may be arranged to be permanently attached to receptacle 1481, e.g., using a hinge mechanism.

Figure 15:
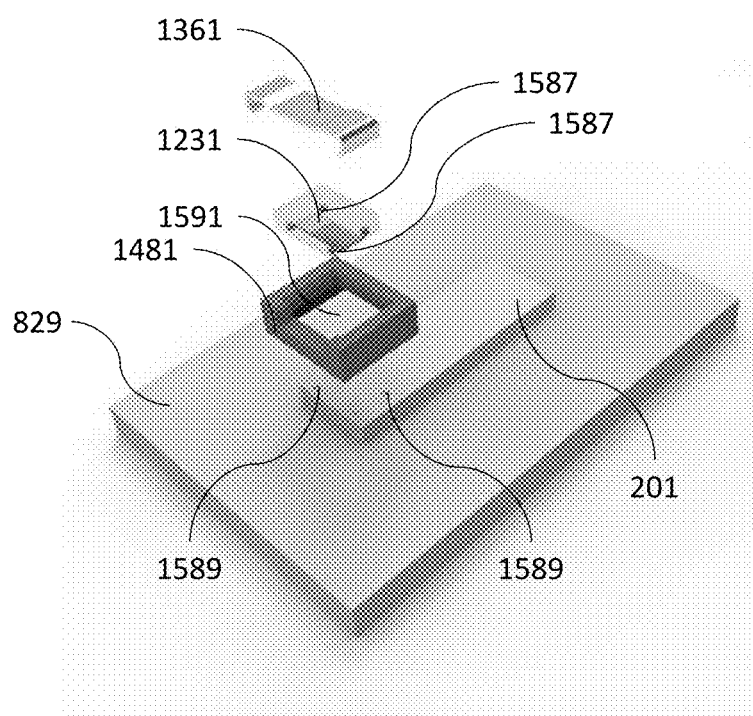
FIG. 15 shows an exploded view of FIG. 14 but without the fibers.

Initial insertion of the detachable photonic plug, by initial insertion of detachable plug die 1231 thereof, into receptacle 1481 provides a rough positioning tolerance of +/−100 μm as a first step before fine alignment. In other words, receptacle 1481 will position detachable plug die 1231 between −100 μm to +100 μm on both the x and y axis, where 0 μm is the ideal position. When detachable plug die 1231 is fully pressed into receptacle 1481, fine alignment male features 1587, e.g., small male protrusions, of detachable plug die 1231, e.g., as seen in FIG. 15, connect to corresponding fine alignment female features 1589 of SiPh chip 201, e.g., small recesses, that match the size and shape of fine alignment male features 1587, so as to provide+/−5 μm or better fine positioning tolerance for the location of detachable plug die 1231. Each of fine alignment male features 1587 and fine alignment female features 1589 may be produced by wafer level manufacturing processes on both SiPh chip 201 and the detachable plug die 1231. Advantageously, such a mechanical structure where the alignment is performed using such alignment features produced at the wafer level provides for superior control of the alignment.

In one embodiment, fine alignment features may be incorporated into spacer 1233 in addition to or in lieu of those of detachable plug die 1231. Illustrative such fine alignment features 1287 of spacer 1233 are shown in FIG. 12. In one embodiment, detachable plug die 1231 may include alignment features to help insure proper placement of spacer 1233.

Those of ordinary skill in the art will readily appreciate that the positioning of the male and female fine alignment features may be reversed, so that the female features are on the detachable plug die 1231 and the male features are on SiPh chip 201.

Additional details regarding the detachable photonic plug may be found in copending U.S. patent application Ser. No. 17/512,200 filed on Oct. 27, 2021 and entitled DETACHABLE CONNECTOR FOR CO-PACKAGED OPTICS, which is incorporated by reference as if fully set forth herein.

Figure 16:
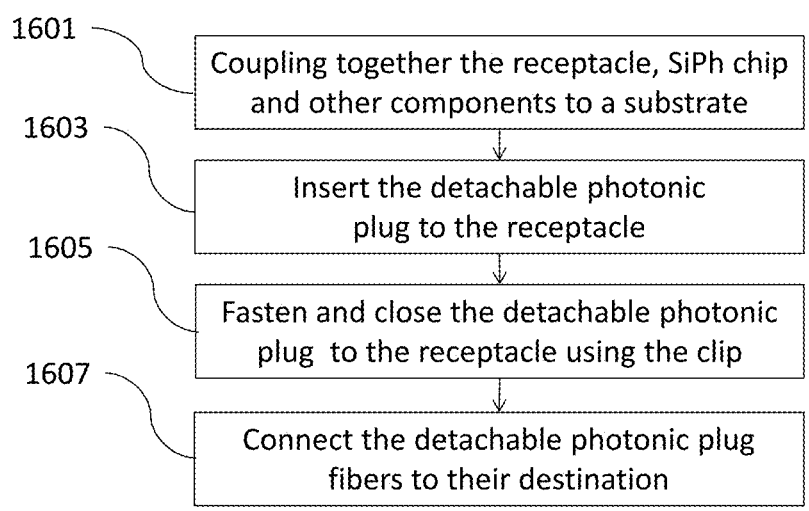
FIG. 16 shows a flowchart of an illustrative process for assembling a detachable plug and connecting an end of fibers to a SiPh chip in accordance with an embodiment.

FIG. 16 shows a flowchart of an illustrative process for assembling a detachable plug and connecting an end of fibers to a SiPh chip in accordance with an embodiment. The process is entered in step 1601 in which a receptacle, e.g., receptacle 1481, a SiPh chip, e.g. SiPh chip 201 and any other optional components not part of the detachable fiber plug, are coupled to a substrate, e.g. substrate 829, which may be an MCM. Such coupling may be performed using soldering, adhesive, a combination thereof, and the like and may be different for various items being coupled together. For example, in one embodiment, a portion of receptacle 1481 may be glued, e.g., using an adhesive, to SiPh chip 201. In another embodiment a portion of receptacle 1481 may be soldered, e.g., using reflow soldering, to substrate 829. SiPh chip 201 may be soldered to the substrate 829, e.g., as described hereinabove in connection with FIG. 8. As part of the coupling the receptacle is permanently mounted so that at least a portion of the receptacle extends over at least a portion of the SiPh chip. In addition, the receptacle should be mounted such that the fine alignment features on SiPh 201 are exposed within the internal area of the receptacle into which detachable plug die 1231 will be placed when it is inserted into the receptacle, e.g., area 1591 of FIG. 15.

Next, in step 1603, the detachable photonic plug is inserted into the receptacle. Advantageously, this step may be performed after any soldering, e.g., reflow soldering, that may be required to form all of the components coupled together in step 1601 as well as to perform the coupling of step 1601. Advantageously, coupling fibers, e.g., fibers 939, to SiPh chip 201, is performed after all soldering, e.g., used to assemble an MCM should substrate 829 be an MCM, is completed.

Thereafter, in step 1605, a clip, e.g., clip 1361, is employed to close the detachable photonic plug by fastening or securing the detachable plug die 1231 within the receptacle.

Lastly, in step 1607, the opposite ends of the fibers, i.e., the fiber ends not within receptacle 1481 and not seen in FIG. 13, are connected to their destination.

In some embodiments, tilted flat mirror 623 may be replaced by a tilted curved mirror. Such a titled curved mirror may act as a focusing element that can change the mode size of the light beam. For example, the tilted flat mirror may be used in an embodiment when the mode field diameter of the waveguide is 9 um. In other embodiments, when the waveguide mode field diameter is different than 9 um the titled curved mirror may be employed. In such an embodiment, the tilted curved mirror is shaped and oriented so that not only does it change the direction of the light, similar in this regard to titled flat mirror 623, but due to its curvature it also converts the light's mode size. Such a tilted curved mirror may be formed by imprint stamping in the same manner as described above for tilted flat mirror 623 and curved mirror 621 but using an imprint stamp that is shaped so as to form a tilted curved mirror surface in lieu of tilted flat surface 519.

In other embodiments tilted flat mirror 623 may be employed but mode conversion may be achieved by forming of the imprint material a mode converter between the end of wave guide 205 and tilted flat mirror 623. The mode converter may be made of an inverted taper and a linear taper which are formed of the imprint material at the same time as the formation curved surface 517 and tilted flat surface 519 takes place, i.e., as part of the same steps that are used to form curved surface 517 and tilted flat surface 519, by using an appropriately shape imprint stamp.

In yet further embodiments, when a grating coupler has been incorporated into SiPh chip at the end of wave guide 205, the grating coupler redirecting light between waveguide 205 and second curved mirror 935, tilted flat mirror 623 is not formed at all.

In still further embodiments, the imprinted structure could be formed as a separate part, e.g., formed on glass or other substrate that is transparent to light at the wavelength of interest, and then installed, e.g., glued, onto the SiPh chip, e.g, so as to extend at least partly within a cavity formed therein as disclosed above.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system, comprising:
    a photonic plug;
    a silicon photonics (SiPh) chip comprising first and a second opposed surfaces, the first surface opposed to the photonic plug;
    a cavity located on the second surface of the SiPh chip towards the first surface of the SiPh chip;
    a waveguide located within the SiPh chip;
    a curved mirror; and
    a tilted flat mirror,
    wherein the curved mirror and the tilted flat mirror are located in the cavity of the SiPh chip.

2. The system of claim 1, wherein both the curved mirror and the tilted flat mirror are formed on a hardened imprint material located in the cavity of the SiPh chip.

3. The system of claim 1, wherein light is couplable between the waveguide and the tilted flat mirror.

4. The system of claim 1, wherein the cavity, the curved mirror, and the tilted flat mirror are formed on a photonic bump of the SiPh chip.

5. The system of claim 1, wherein the SiPh chip further comprises a layer of antireflective coating between at least a portion of a bottom of the cavity and one of the curved mirror and the tilted flat mirror.

6. The system of claim 1, wherein the SiPh chip further comprises a layer of antireflective coating on a portion of the first surface.

7. The system of claim 1, wherein the SiPh chip is flip chip mounted to a substrate, the second surface of the SiPh chip being attached to the substrate using one or more microbumps.

8. The system of claim 1, wherein the photonic plug further comprises:
    a spacer having one surface thereof coupled to the first surface of the SiPh chip, and wherein the photonic plug is mounted to a surface of the spacer opposing the one surface of the spacer.

9. The system of claim 8, wherein the spacer is substantially optically transparent to at least one wavelength of light.

10. The system of claim 8, wherein the photonic plug comprises:
a second curved mirror and a second tilted flat mirror, wherein the second tilted flat mirror and the second curved mirror are laterally spaced from each other by a predefined distance.

11. The system of claim 10, wherein the second tilted flat mirror is positioned at a predefined lateral distance from an opening within the photonic plug, the opening configured to receive an optical signal from an optical fiber, the second tilted flat mirror being oriented so as to change a direction of a received optical signal.

12. The system of claim 1, wherein the photonic plug comprises a detachable photonic plug, the system further comprising:
a receptacle adapted to receive the detachable photonic plug, wherein the detachable photonic plug is adapted to couple one or more single mode optical fibers to the SiPh chip.

13. The system of claim 12, wherein the receptacle is located over a portion of the first surface of the SiPh chip.

14. The system of claim 12, wherein the receptacle extends over at least one fine alignment feature formed on the first surface of the SiPh chip.

15. The system of claim 1 further comprising:
a clip, removably coupled to the receptacle, to secure the detachable photonic plug within the receptacle.

16. The system of claim 12, wherein the detachable photonic plug comprises:
a second tilted flat mirror and a second curved mirror, wherein the second tilted flat mirror and the second curved mirror are laterally spaced from each other by a predefined distance, and wherein the second tilted flat mirror is positioned at a predefined lateral distance from an opening within the detachable photonic plug, the opening configured to receive an optical signal from an optical fiber, the second tilted flat mirror being oriented so as to change a direction of a received optical signal.

17. The system of claim 8, wherein a fine alignment feature is implemented on at least one of the group consisting of the photonic plug and the spacer, the fine alignment feature being adapted to mate to a corresponding fine alignment feature of the SiPh chip.

18. The system of claim 8, further comprising an antireflective coating on a portion of a surface of the spacer that faces the first surface of the SiPh chip.

19. The system of claim 7, further comprising:
a layer of hardened stamped imprint material located in the cavity and on the first surface of the SiPh chip, wherein a height of the microbumps is greater than a height of the layer of material located on the first surface of the SiPh chip.

\* \* \* \* \*